Sept. 18, 1923.  1,468,395
R. P. PLACE
EMERY WHEEL DRESSING TOOL
Filed Sept. 14, 1921

INVENTOR.
Roland P. Place
BY
Edward N. Pagelsen,
ATTORNEY.

Patented Sept. 18, 1923.

1,468,395

UNITED STATES PATENT OFFICE.

ROLAND P. PLACE, OF MIDLAND, MICHIGAN, ASSIGNOR TO ROLAND P. PLACE COMPANY, OF MIDLAND, MICHIGAN, A CORPORATION OF MICHIGAN.

EMERY-WHEEL DRESSING TOOL.

Application filed September 14, 1921. Serial No. 500,609.

*To all whom it may concern:*

Be it known that I, ROLAND P. PLACE, a citizen of the United States, and residing at Midland, in the county of Midland and State of Michigan, have invented a new and Improved Emery-Wheel Dressing Tool, of which the following is a specification.

This invention relates to the construction of the cutter cylinder for truing grinding wheels, and its object is to provide a cutter cylinder which may be readily disassembled in order that the worn cutter disks may be quickly replaced.

This invention consists in the details of construction illustrated in the accompanying drawing and particularly pointed out in the claims.

Figure 1:
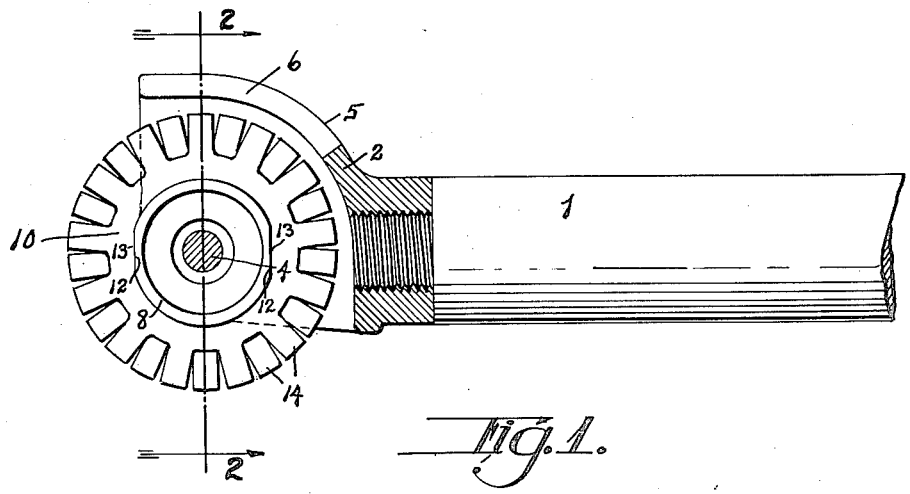
Figure 2:
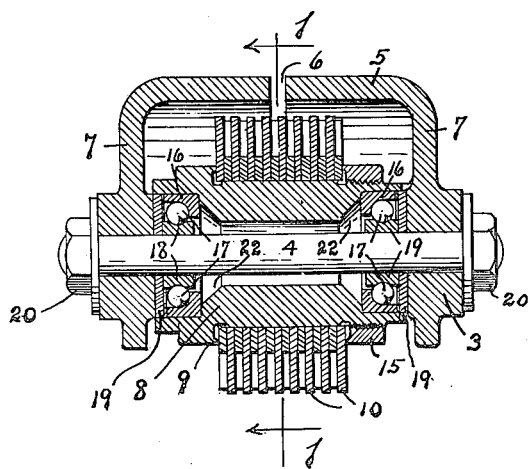
Figure 3:
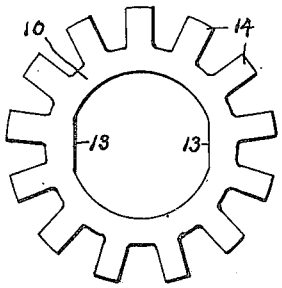
Figure 4:
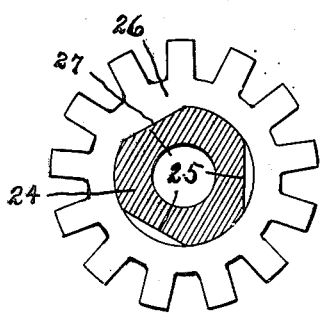

In the drawing, Fig. 1 is a section of this dressing tool on the line 1—1 of Fig. 2, the sleeve and the cutters thereon being in elevation. Fig. 2 is a section on the line 2—2 of Fig. 1. Fig. 3 is an elevation of a cutter disk. Fig. 4 is a transverse cross section through the sleeve with a cutter thereon.

Similar reference characters refer to like parts throughout the several views.

The holder for the cutters consists of a handle or shank 1 and a head 2, formed with approximately parallel and alined hubs 3 for the shaft 4, and a hood 5 which has a narrow slit 6 to permit the hubs 3 and the sides 7 which support these hubs to be forced toward each other. That portion of the body extending between the hubs 3 and receiving the threaded end of the shank 1 may be termed a yoke. When made of good tough cast iron, these hubs may be forced toward each other more than one-one hundredth of an inch for each inch of distance from the center of the shaft 4 to the adjacent wall of the head in alinement with the handle, without damage to the metal. When made of malleable iron or cast steel, then this movement may be much greater.

Mounted within the head is a sleeve 8 having a shoulder 9 against which the cutter disks 10 are positioned. The bearing portion of the sleeve is formed with flats 12 to be engaged by the flat portions 13 of the bore of these disks. These cutters are preferably formed with an uneven number of teeth 14 so that when assembled, the teeth of adjacent cutters alternate, as indicated in Fig. 1. The teeth have parallel sides and are thus of uniform cross section throughout their lengths. The cutters are rigidly held in position by the nut 15. The sleeve, nut and cutters constitute a cutter cylinder. The sleeve 8 is counterbored at its ends to receive the bearing rings 16 which run on the balls 17, and these in turn run on the inner rings 18 which are tight but slidable on the shaft 4. A washer 19 is rotatably fitted in each counterbore in the ends of the sleeve 8 and prevents the entrance of grit, and these washers bear against the hubs 3 and the bearing rings 18. The hubs are drawn toward each other by the nuts 20 on the ends of the shaft 4.

The inner ends of the hubs 3 are milled with great accuracy and the length of the sleeve 8 with its bearings and the washers 19 is made substantially as great as possible and still permit them to be positioned. Thereafter the shaft 4 is introduced and the nuts 20 screwed up until the hubs 3 are drawn toward each other sufficiently to properly adjust the bearings through pressure on the washers 19.

It will be noticed that the bearing faces of the shoulder 9 and of the nut 15 are relieved so as to cause the pressure of these two to be exerted along their peripheries. This avoids the danger of a firm grip on the cutter disks being lost through the presence of small fins along the edges of the holes in these cutters.

When the cutters are worn out they may be replaced by taking out the bolt 4, removing the sleeve and taking off the nut 15. New sets of cutter disks are supplied properly assembled and tied together by a wire wrapping so they may be mounted on the sleeve with least loss of time. Should an outer bearing ring 16 become injured it can readily be removed by driving it out by means of a curved tool, the conical bores 22 of the sleeve 8 readily permitting this operation.

In Fig. 4 I have shown a sleeve 24 having three flats 25 and the cutter disk 26 with a flat 27 to fit any one of the flats on the sleeve. The number of teeth is one more than a multiple of the number of flats on the spindle so that when the cutter disks 26 are arranged with flats 27 contacting with successive flats 25 circumferentially of the sleeve, the teeth 14 will constitute spirals, as shown in the Hoy and Place Patent No. 1,276,366, dated August 20, 1918, each tooth being circumferentially spaced one third the pitch of the teeth in advance or back of the next tooth. In every case where the cutter disk has one tooth more than a multiple of the number of flats on the sleeve, the cutters can be so arranged that the circumferential spacing of the teeth will be the pitch of the teeth divided by the number of the flats on the spindle.

The proportions and the details of the several parts of this dressing tool may all be changed by those skilled in the art without departing from the spirit of my invention as set forth in the following claims.

I claim:—

1. In a dressing tool, a holder and a shaft therein, a sleeve mounted on the shaft and having a threaded end, a shoulder at the other end and a body between the threaded end and shoulder formed with flats, a nut on the threaded end, and outer disks fitting on said body and having an uneven number of teeth, the teeth of adjacent disks alternating.

2. In a dressing tool, a holder and a shaft therein, a sleeve mounted on the shaft and having a circumferential shoulder at one end and the opposite end threaded, a nut on said threaded end, the body of the sleeve between the nut and shoulder being generally cylindrical and having diametrically opposite parallel flats extending from the nut to the shoulder, and cutter disks fitting on the body of the sleeve between the nut and shoulder, the teeth of adjacent cutters alternating.

3. In a dressing tool, a holder and a shaft therein, a sleeve mounted on said shaft and having a plurality of flats, and annular cutters fitting on the sleeve and having a flat on its inner side to fit the flats on the sleeve and having radial teeth, the number of the teeth on all the cutters being the same but differing in number from a multiple of the flats on the sleeve.

4. In a dressing tool, a holder, a sleeve rotatably mounted therein and having an external surface comprising a plurality of longitudinal flats, and annular cutters fitting on said sleeve and having a flat on its inner side to fit the flats on the sleeve, the number of the teeth of each cutter being one more than a multiple of the flats on the sleeve.

5. In a dressing tool, a holder and a shaft therein, a sleeve mounted on said shaft, annular cutters fitting on the sleeve and having radial teeth, said sleeve being generally cylindrical externally but provided with a plurality of longitudinal deformations, said cutters having their bores formed to fit at least one of said deformations, the number of teeth on all the cutters being the same, the number of teeth on each cutter differing in number from a multiple of the deformations on the sleeve.

ROLAND P. PLACE.